(12) United States Patent
Nakao et al.

(10) Patent No.: US 7,012,774 B2
(45) Date of Patent: Mar. 14, 2006

(54) MAGNETIC TAPE AND SERVO WRITER

(75) Inventors: Toru Nakao, Kanagawa (JP); Takahisa Izumida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 11 days.

(21) Appl. No.: 10/878,248

(22) Filed: Jun. 29, 2004

(65) Prior Publication Data

US 2005/0057840 A1    Mar. 17, 2005

(30) Foreign Application Priority Data

Sep. 16, 2003    (JP)    ............................. 2003-322403

(51) Int. Cl.
*G11B 5/09* (2006.01)
*G11B 21/02* (2006.01)
(52) U.S. Cl. ........................................ 360/48; 360/75
(58) Field of Classification Search ..................... None
See application file for complete search history.

(56) References Cited

U.S. PATENT DOCUMENTS

| | | | |
|---|---|---|---|
| 5,689,384 A | 11/1997 | Albrecht et al. | |
| 5,946,159 A * | 8/1999 | Chliwnyj et al. | ........ 360/77.12 |
| 6,172,833 B1 | 1/2001 | Fry et al. | |

FOREIGN PATENT DOCUMENTS

JP    8-30942 A    2/1996

* cited by examiner

*Primary Examiner*—David Hudspeth
*Assistant Examiner*—Daniell L. Negron
(74) *Attorney, Agent, or Firm*—Sughrue Miion, PLLC

(57) ABSTRACT

Disclosed are a magnetic tape capable of suppressing deterioration of the S/N ratio of the data and servo signals and adapted to high density recording design, and a servo writer capable of producing the above magnetic tape. Further, the magnetic tape includes a DC-magnetized DC written region, a servo signal being written onto the DC written region, and a data track. Here, the DC written region and the servo signal are formed to satisfy a relationship $-1.5 \times Tw \leq Fd \leq 1.5 \times Tw$, where Fd denotes a position of an end of the DC written region with respect to an end of the servo signal, and Tw denotes a width of the data track.

20 Claims, 8 Drawing Sheets

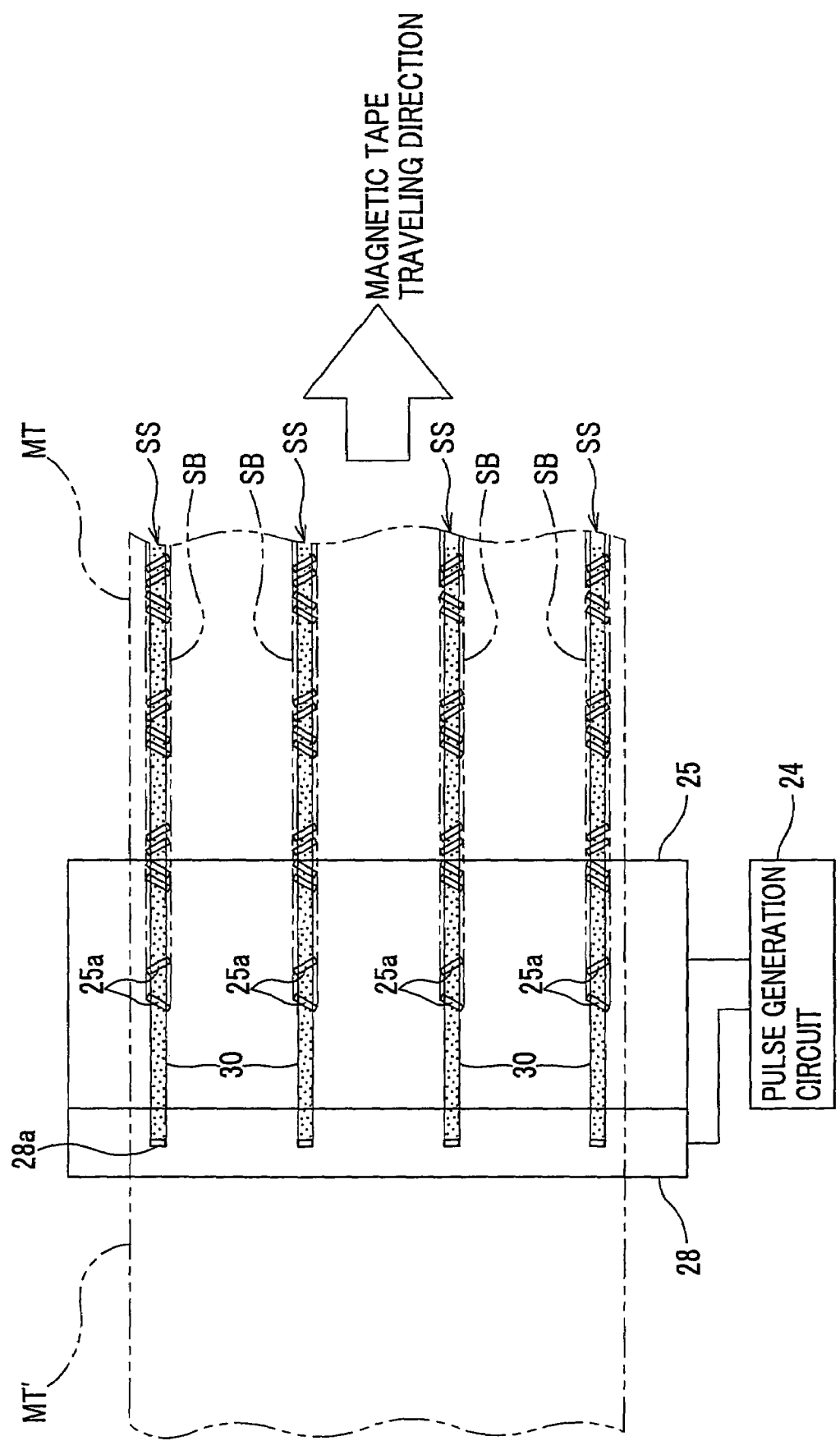

FIG.8A
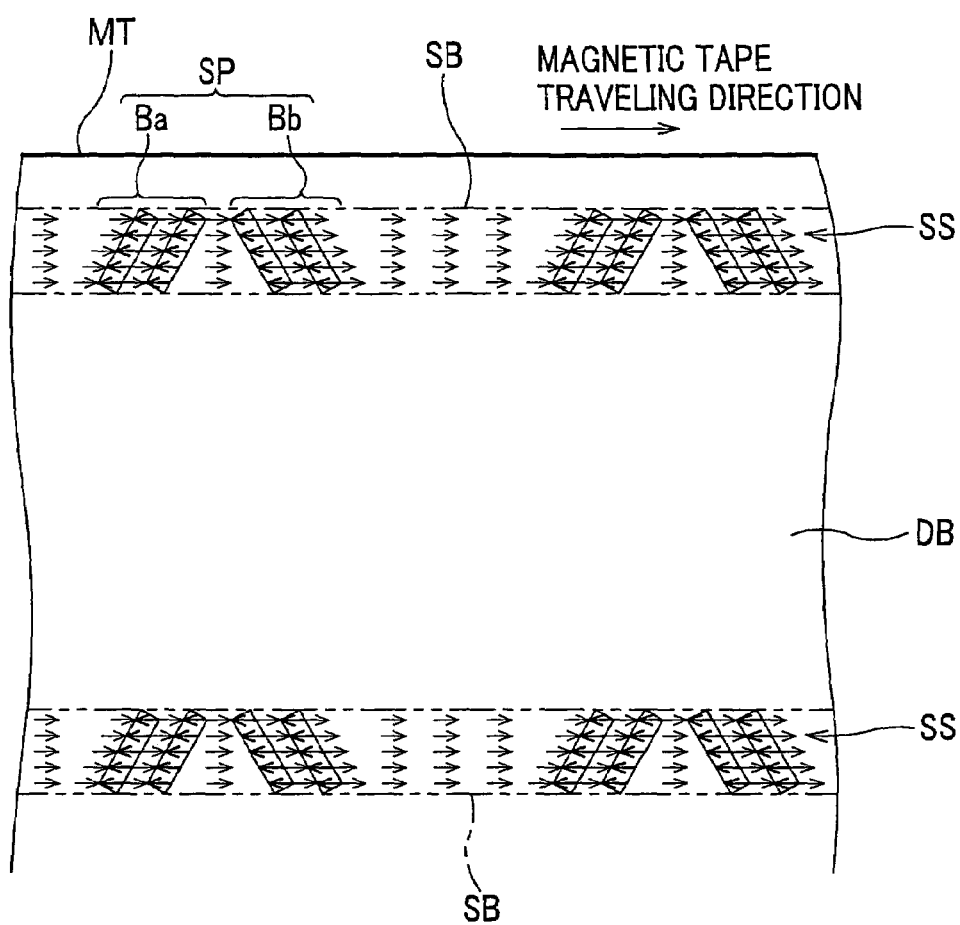
FIG.8B OUTPUT READ FROM SERVO SIGNAL

MAGNETIC TAPE AND SERVO WRITER

BACKGROUND OF THE INVENTION

1. Field of the Invention

The present invention relates to a magnetic tape in which a servo signal is written onto a DC-magnetized servo band, and a servo writer which subjects a servo band of a magnetic tape to DC magnetization before writing a servo signal thereonto.

2. Description of the Related Art

In recent years, high density recording design in magnetic tapes has advanced, and some magnetic tapes for backup media of computers have a recording capacity of several hundreds of gigabytes. Magnetic tapes therefore have several hundreds of data tracks along the width thereof. Such high density recording design involves excessive narrowing of the data tracks and of the intervals between the adjacent data tracks in a magnetic tape.

Thus, in order to allow recording/reproducing devices of a magnetic head to trace such narrow data tracks, servo signals are written onto a magnetic tape in advance, and the servo signals are then read by a magnetic head, while the position of the magnetic head relative to the magnetic tape (the position along the width of the magnetic tape) is servo-controlled (refer to Japanese Unexamined Patent Application (KOKAI) Heisei No. 8-30942 (Paragraph No. 0016 and FIG. 1)).

The above servo signal is written onto the servo band of a magnetic tape, by applying a recording current to a magnetic head of a servo writer so as to magnetize the non-magnetized servo band in one direction. Conventionally, as shown in FIG. 7A, the servo signals SS are recorded onto the corresponding non-magnetized servo bands SB, by feeding to a magnetic head a recording pulse current PC constituted of a zero current and a plus pulse current, as a recording current. Now that the saturation phenomenon of a servo signal read device such as MR element is avoided by writing the servo signal SS in such a manner.

In the recording pulse current PC, as shown in FIG. 7B, when the zero current out of the recording pulse current PC is fed to the magnetic head, the servo bands SP are not magnetized. On the other hand, when the plus pulse current is fed thereto, due to leakage flux generated from the head gap of the magnetic head, the servo bands SB are magnetized in one direction to form servo patterns SP, so that the servo signals SS are written onto a magnetic tape MT'. Here, each space between the adjacent servo bands SB serves as a data band DB onto which data signals are to be written.

A magnetic tape recording/reproducing device has at least one servo signal read device, such as MR element which changes its electrical resistance in accordance with a magnetic quantity. The magnetic tape recording/reproducing device detects, based on the variation of electrical resistance of the above MR element, the variation of the magnetic field generated from the servo signal SS, and outputs the variation of the magnetic field as a read signal in a differential waveform mode (voltage value). As the variation of electrical resistance of the MR element is increased, the peak voltage value obtained by reading the servo signal SS is increased. As a result, the output read from the servo signal SS has an improved S/N ratio. Accordingly, when the magnetic field generated from the servo signal SS has a great variation, or when the servo signal read device (the MR element) has a large sensing area due to its wide dimensions, the output RSL read from the servo signal SS is increased as shown in FIG. 7(c).

In future, however, it is expected that magnetic tapes will advance to have a memory capacity of several tens of terabytes. As such high density recording design proceeds, the number of data tracks formed on a magnetic tape is increased, the wide of data tracks and interval between adjacent data tracks are further narrowed, and a magnetic tape itself is thinned. Accompanied with this, magnetic quantity which can be detected from the servo signals SS on a magnetic tape is decreased. Further, the variation of the magnetic quantity which can be detected from the servo signals SS by the servo signal read device of a magnetic head is also decreased. Due to this decrease, the output RSS read from the servo signal SS has a low peak voltage value as shown in FIG. 7D, in other words, the S/N ratio of the output RSS is deteriorated. Finally, the magnetic tape recording/reproducing device cannot read the servo signals SS correctly, whereby the position of the magnetic head is unable to be controlled with high precision. For this reason, the deterioration of the S/N ratio has been becoming more serious problem than that regarding the above saturation phenomenon of the MR element.

In view of the above problem, a following technique is devised in the invention already filed by this applicant [JP2003-110396 (not published, that is, not prior art)]. The servo band SB of a magnetic tape MT' is magnetized by use of a DC erase head (not shown) in one direction (i.e., a DC magnetization) along the length of the magnetic tape MT', and the servo signal SS is then recorded onto the servo head by magnetizing it in the direction opposite to the one direction (refer to FIG. 8A). Incidentally, in FIG. 8A, the magnetized directions are denoted by small arrows. The output (peak voltage value) which is read from the servo signal SS by the servo signal read device depends on a variation ratio or amount at a boundary between portions onto which a signal is not recorded and onto which a signal is recorded. For this reason, an orientation of a magnetic field greatly changes from the forward to reverse directions at the boundary between the forwardly magnetized portion and the reversely magnetized portion on the servo band. Similarly, the orientation of a magnetic field greatly changes from the reverse to forward directions at the boundary between the reversely magnetized portion and the forwardly magnetized portion. In such a manner, obtained can be, the large output read from the servo signal SS in accordance with such large variation ratio or amount, as shown in FIG. 8B. In other words, the output can have the improved S/N ratio. Here, it can also be considered that applying the above DC magnetization technique to the data band DB improves the S/N ratio of the output read from the data. It has however been recognized that this application yields an undesired result that "DC noise" occurs upon reading of the data, causing the reduction in the S/N ratio.

The above-described technique has had a disadvantage that, if a DC-magnetized region by the DC erase head (hereinafter, refers to as "DC written region") is largely shifted from the servo band SB and is entered into a part of the data band DB, then "DC noise" occurs upon reproducing of the data signal, causing the reduction in the S/N ratio. Further, if the data are recorded onto the data band aside from this part, then the recording density is decreased by the area of this part. This has caused another disadvantage.

Similarly, when the magnetic tape MT' is moved along the width thereof after undergoing the DC-magnetization by the DC erase head, the servo signal SS written by the servo signal write head is largely shifted from the DC written region, thereby causing the reduction in the S/N ratio of the shifted servo band.

In consideration of the above disadvantages, the present invention is made. An object of the present invention is to provide a magnetic tape and a servo writer capable of preventing the reduction in the S/N ratio of the output read from the data and servo signals, as well as contributing to the high density recording design.

SUMMARY OF THE INVENTION

A magnetic tape includes a DC-magnetized DC written region, a servo signal being written onto the DC written region, and a data track. Further, the DC written region and the servo signal are formed to satisfy a relationship $$-1.5 \times Tw \leq Fd \leq 1.5 \times Tw,$$

where Fd denotes a position of an end of the DC written region with respect to an end of the servo signal, and Tw denotes a width of the data track.

Herein, a description is given of the relationship between the one ends of the DC written region and the servo signal but, naturally the other ends thereof has the same relationship as that of the one ends.

With this magnetic tape, the DC written region and the servo signal are formed such that a distance between the respective ends of them is equal to or less than 1.5 times the width of the data track. This means that the DC written region is not largely shifted from the servo signal and, thus is not excessively entered into the servo signal. Specifically, since a part where the servo signal is shifted from the DC written region is extremely small, it is possible to ignore the shifted part and to use only the remaining part of the servo signal on the DC written region. As a result, deterioration of the S/N ratio of the output read from the servo signal can be prevented.

Also, the DC written region and the servo signal may be formed to satisfy a relationship $$-Tw \leq Fd \leq Tw.$$

Furthermore, the DC written region and the servo signal may be formed to satisfy a relationship $$-(Ps-Sw/2) < Fd < Pd-Tw/2,$$

where Ps denotes a distance from the end of the servo signal to a nearest point on a middle of the servo track, Sw denotes a width of a servo signal read device for tracing the servo track, and Pd denotes a distance from the end of the servo signal to a nearest point on the middle of the data track.

This is how the servo signal is exactly traced on a drive, making it possible to obtain the effect of the DC written region upon reading of the servo signal. In addition, since the data are not somewhat entered into the DC written region, it is possible to prevent deterioration of the S/N ratio of the output read from the data.

Moreover, the DC written region and the servo signal may be formed to satisfy a relationship $$-(Ps-Sw/2-(Tw-Rw)/2) < Fd < Pd-Tw/2-(Tw-Rw)/4,$$

where Ps denotes a distance from the end of the servo signal to a nearest point on a middle of the servo track, Sw denotes a width of the servo signal read device for tracing the servo signal, Rw denotes a width of the data read device for tracing the data track, and Pd denotes a distance from the end of the servo signal to a nearest point on a middle of the data track.

In this way, it is possible to obtain the effect of the DC written region upon reading of the servo signal even if the magnetic tape is shifted along the width thereof. In addition, since the data are not somewhat entered into the DC written region, deterioration of the S/N ratio of the output read from the data can be prevented.

Moreover, a servo writer of the present invention, which writes a servo signal onto a DC-magnetized DC written region of a magnetic tape, is constituted as follows. A magnetic tape running system, which includes a supply reel and a take-up reel, travels a magnetic tape by taking up, by use of the take-up reel, the magnetic tape fed from the supply reel. A DC erase head, which has a head gap, subjects a part of the magnetic tape to DC magnetization in one direction along length of the magnetic tape while being in contact with the running magnetic tape to thereby form a DC written region. A servo signal write head, which has a head gap and is provided downstream of the DC erase head in a traveling direction of the magnetic tape, writes the servo signal onto the DC written region by magnetizing the DC written region in a direction opposite to the one direction while being in contact with the running magnetic tape. Here, the head gaps of the DC erase head and of the servo signal write head have respective dimensions capable of producing a magnetic tape which satisfies a relationship $$-1.5 \times Tw \leq Fd \leq 1.5 \times Tw.$$

By use of this servo writer, the DC-magnetized DC written region and the servo signal of the magnetic tape are formed such that a distance between respective ends of them is equal to or less than 1.5 times the width of the data track. This means that the DC-magnetized region is not largely shifted from the servo signal and, thus is not excessively entered into the servo signal. Specifically, since a part where the servo signal is shifted from the DC written region is extremely small, it is possible to ignore the shifted part and to use only the remaining part of the servo signal on the DC written region. This enables, to be prevented, deterioration of the S/N ratio of the output read from the servo signal.

Also, the DC written region and the servo signal may be formed to satisfy preferably a relationship $$-Tw \leq Fd \leq Tw,$$

and more preferably a relationship $$-(Ps-Sw/2) < Fd < Pd-Tw/2,$$

where Ps denotes a distance from the end of the servo signal to a nearest point on a middle of the servo track, Sw denotes a width of a servo signal read device for tracing the servo track, and Pd denotes a distance from the end of the servo signal to a nearest point on the middle of the data track.

It is most preferable that they are formed to satisfy a relationship $$-(Ps-Sw/2-(Tw-Rw)/2) < Fd < Pd-Tw/2-(Tw-Rw)/4,$$

wherein Ps denotes a distance from the end of the servo signal to a nearest point on a middle of the servo track, Sw denotes a width of the servo signal read device for reading the servo signal, Rw denotes a width of the data read device for reading the data track, and Pd denotes a distance from the end of the servo signal to a nearest point on a middle of the data track.

With the magnetic tape and the servo writer of the present invention, it is possible to suppress deterioration of the S/N ratio of the outputs read from the data and servo signals, as well as to contribute to the high density recording design, thanks to an appropriate distance between the ends of the DC written region and of the servo signal.

Features and objects of the present invention other than the above will become clear by reading the description of the present specification with reference to the accompanying drawings.

BRIEF DESCRIPTION OF THE DRAWINGS

For a more complete understanding of the present invention and the advantages hereof, reference is now made to the following description taken in conjunction with the accompanying drawings wherein:

FIG. 6 is a plane view depicting a DC erase head and a servo signal write head of the servo writer.

FIG. 8A is an enlarged plane view depicting a magnetized state of a magnetic tape according to a related art; and FIG. 8B is a view depicting an output read from the magnetic tape of FIG. 8A.

DETAILED DESCRIPTION OF THE PREFERRED EMBODIMENT

At least the following matters will be made clear by the explanation in the present specification and the description of the accompanying drawings.

Figure 1:
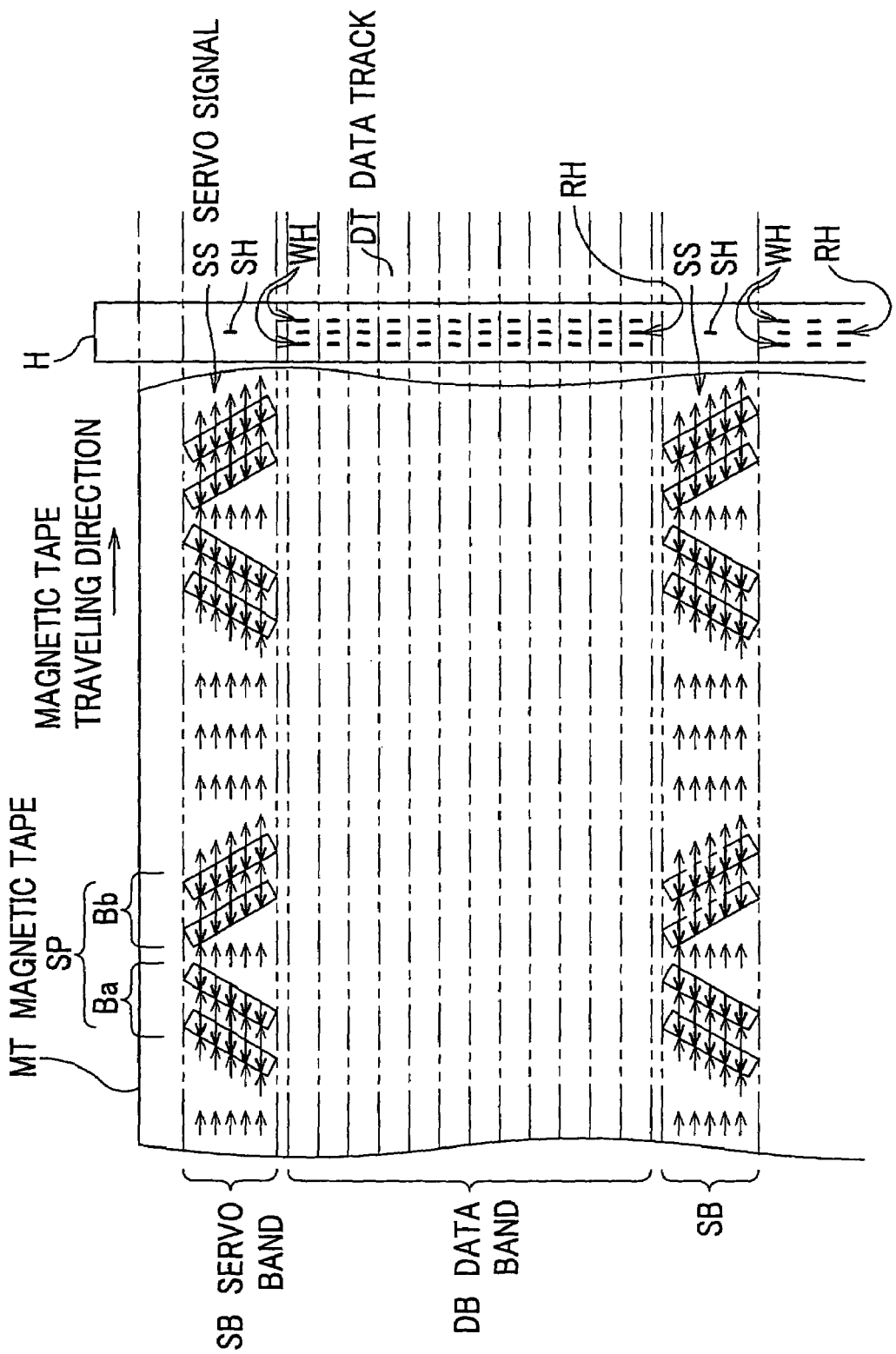
FIG. 1 is a plane view depicting a magnetic tape according to the embodiment of the present invention.
Figure 2A:
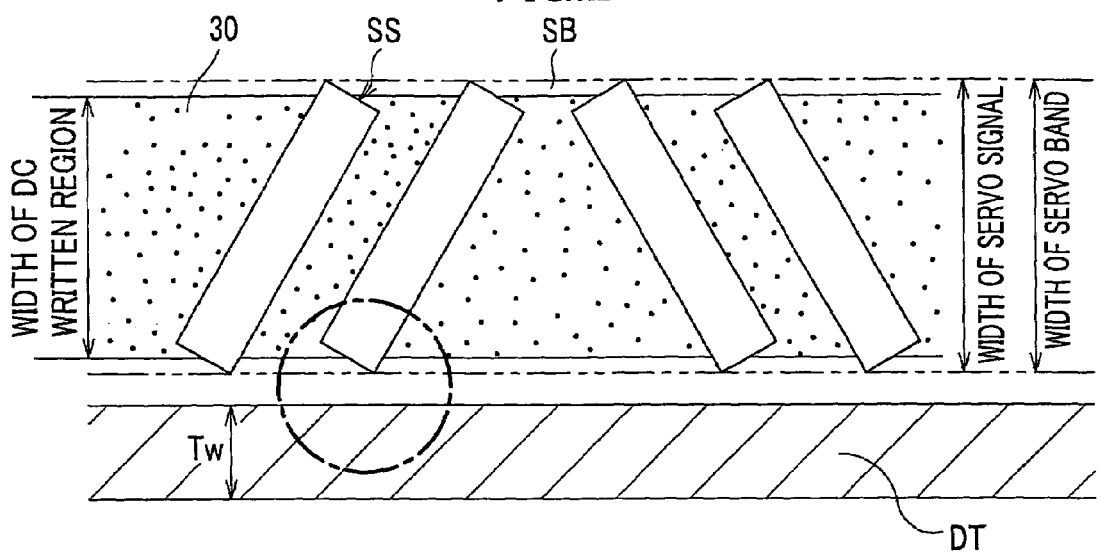
FIG. 2A is an enlarged view depicting a relationship between a servo band and a DC written region of the magnetic tape.
Figure 2B:
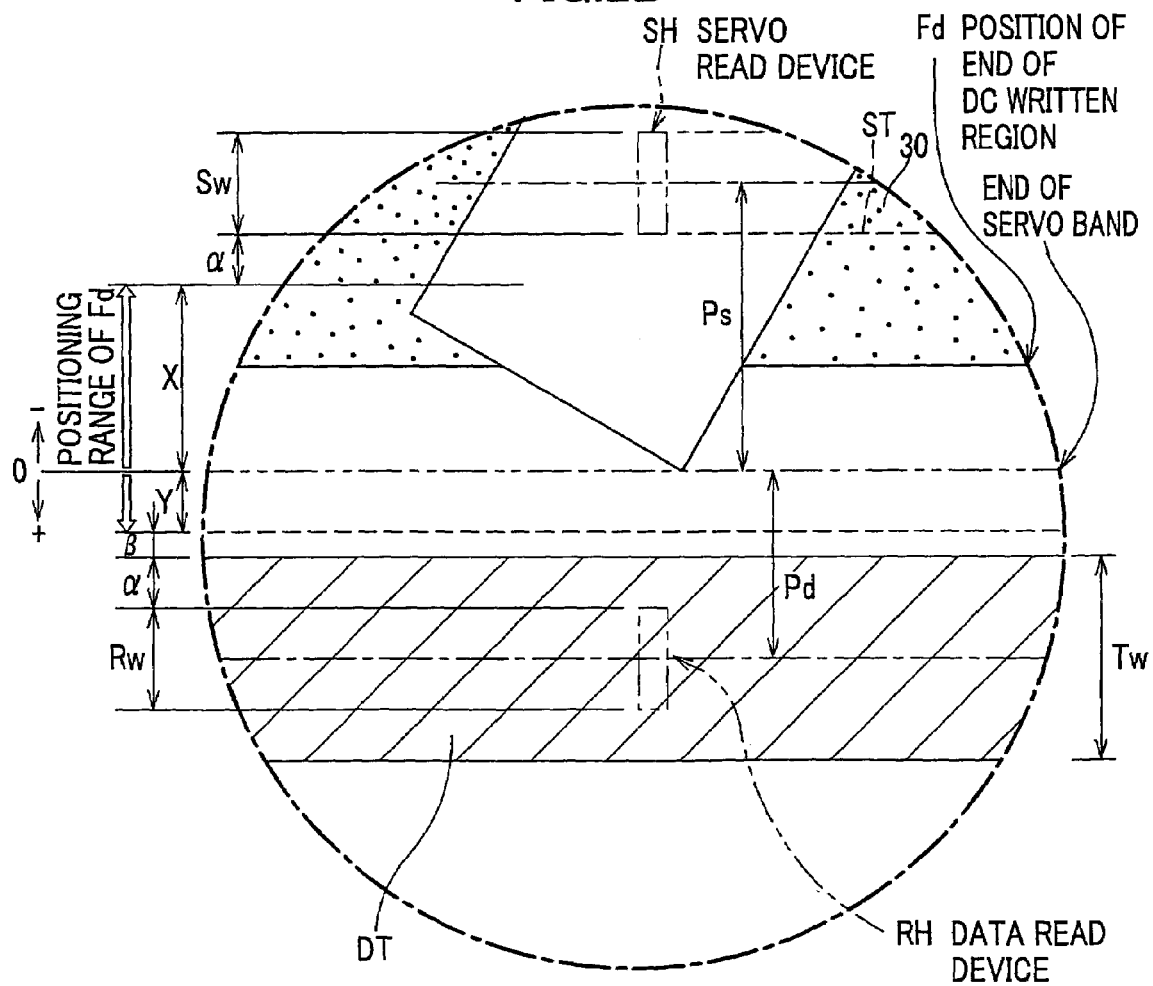
FIG. 2B is an enlarged view depicting the detail of a portion circled by a broken line in FIG. 2A.

A description will be given below in detail of an embodiment of the present invention with reference to the figures as appropriate. In these figures, FIG. 1 is a plane view depicting a magnetic tape according to this embodiment; FIG. 2A is an enlarged view depicting a relation between a servo band and a DC written region; and FIG. 2B is an enlarged view depicting a detail of a portion encircled by a broken line in FIG. 2A.

As shown in FIG. 1, a magnetic tape MT' includes a plurality of servo bands SB extending along the length of the tape MT', and at least one data band DB disposed between the adjacent servo bands SB. The servo bands SB are designed to undergo DC magnetization in the traveling direction of the magnetic tape MT' along the length thereof (hereinafter, refer to as "forward direction") (refer to arrows in the figure). In FIG. 1, the magnetized direction is denoted by small arrows. Servo signals SS are written onto the corresponding servo bands SB by magnetizing them in the reverse direction. Each servo signal SS is formed by repeating, at predetermined intervals along the length of the magnetic tape MT', a servo pattern SP including a burst Ba and a burst Bb. Incidentally, the burst Ba is a portion which is constituted of two magnetized stripes having a slope of positive angles relative to the traveling (transport) direction, and the burst Bb is a portion which follows the burst Ba and which is constituted of two magnetized stripes having a slope of negative angles relative to the traveling direction.

Herein, the servo band SB means a region onto which the servo signal SS is to be written, as well as a region onto which the servo signal SS has been actually written. Specifically, the servo band SB means a region sandwiched by two lines being drawn by bonding the respective ends of the actually written servo signals SS. Moreover, it is ideal that the servo band SB is entirely DC-magnetized, but is actually not. The servo band SB and the actually DC-magnetized region are formed with being somewhat shifted from each other. Accordingly, the actually DC-magnetized region refers to as a DC written region 30 as distinguished from the servo band SB in a following description.

In FIG. 1, the servo patterns SP are enlarged relative to the magnetic tape MT' for the sake of understanding. Also, in this embodiment, each servo pattern SP is constituted of four stripes having slopes of positive and negative angles in twos, but modifications can be made as appropriate. For example, it may be constituted of ten stripes having slopes of positive and negative angles in fives and, further two types of servo patters SP1 may be alternately arranged; one is constituted of ten stripes having slopes of positive and negative angles in fives and the other is constituted of eight stripes in fours.

The data band DB between the adjacent servo bands SB is not magnetized, that is, AC-magnetized in such a manner that magnetic powder in the magnetic layer is randomly oriented in the forward or reverse direction. The data band DB is constituted of a plurality of data tracks DT extending along the length of the magnetic tape MT'. Data are recorded/reproduced onto/from the data tracks DT by allowing data recording devices WH/data read devices RH provided in a magnetic head H of a magnetic tape recording/reproducing apparatus (not shown) to trace the corresponding data tracks DT. Also, the magnetic head H includes servo signal read devices SH for reading the servo signals SS, in addition to the data recording devices WH and the data reading devices RH. The positioning of the magnetic head H is controlled along the width of the magnetic tape MT', based on the outputs read from the servo signals SS by the servo signal read devices SH. This enables the data recording devices WH and the data reading devices RH to surly trace the corresponding data tracks DT.

A description will be given below in detail of a relationship between the DC written region 30 and the servo band SB (or servo signal SS).

As shown in FIG. 2A, the DC written region 30 is formed to be narrower than the servo band SB along the width of the magnetic tape MT'. The DC written region 30 and the servo band SB are formed in such a manner that a distance between respective like ends (one ends and the other ends) of the DC written region 30 and the servo band SB fall within a predetermined range. Note that a description will be given below of the above relationship by exemplifying only one ends thereof, but since the relationship of the other ends is the same as that of the one ends, a description therefor will be omitted.

The position Fd of end of the DC written region 30 satisfies a following equation with respect to the end of the servo band SB, as shown in FIG. 2B. Here, suppose that a position of end of the servo band SB is an origin, a direction from this end toward the data track DT is positive (+), whereas a direction from this end toward the servo track ST is negative (−). In this case, the following equation will be given:

$$-(Ps-Sw/2-(Tw-Rw)/2) < Fd < Pd-Tw/2-(Tw-Rw)/4 \quad (1)$$

where Ps is a distance from the end of servo band SB to the nearest point on a middle of the servo track ST, Sw is the width of the servo signal read device SH, Tw is the width of the data track DT, Rw is the width of the data read device RH, and Pd is a distance from the end of the servo band SB to the nearest point on the middle of the data track DT.

Here, the servo track ST means a portion which the servo signal read device SH traces. Also, in the equation (1), (Tw−Rw)/2 corresponds to α shown in the figure, and (Tw−Rw)/4 is a half of α and corresponds to β shown in the figure. Further, α corresponds to an allowable region of shift of the servo signal read device SH due to the movement of the magnetic tape MT' along the width thereof, and β corresponds to an allowable region of shift of the data write device (not shown) due to the movement of the magnetic tape MT' along the width thereof upon writing of data. Specifically, the region from the end of the servo band SB to the portion satisfying the relationship (Ps−Sw/2−(Tw−Rw)/2) (negative region) indicates a region where the servo signal read device SH does not scan even if it is shifted from the normal position. Meanwhile, the region from the end of the servo band SB to the portion satisfying the relationship (Ps−Tw/2−(Tw−Rw)/4) (positive region) indicates a region where the data write device does not write the data even if it is shifted from the normal position (i.e. a region where the DC written region 30 allows to protrude from the servo band SB).

Incidentally, in FIG. 2B, the position Fd of end of the DC written region 30 is located within the servo band SB, but it may not be limited to this position as long as it satisfies the above relationship. For convenience of description, the negative region (the region satisfying (Ps−Sw/2−(Tw−Rw)/2) is replaced by X, whereas the positive region (the region satisfying (Pd−Tw/2−(Tw−Rw)/4) is replaced by Y and, then this concrete example will be described with reference to FIG. 3.

Figure 3A:
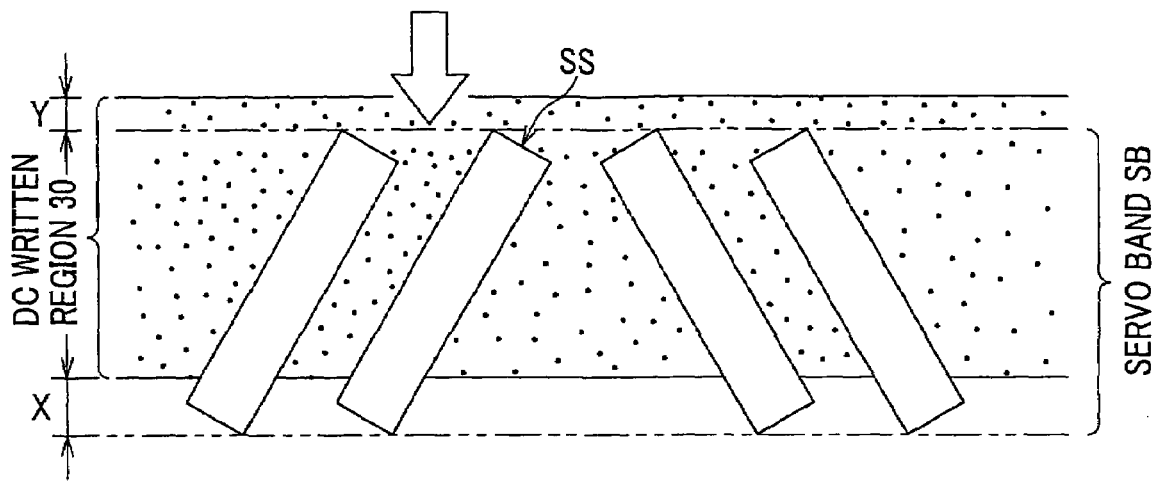
FIG. 3A is an enlarged view depicting a state where the servo signal is shifted downwardly relative to the DC written region.

As shown in FIG. 3A, when the magnetic tape MT' is shifted toward the one side along the wide thereof (hereinafter, refer to as "lower side") after the DC magnetization, the lower portion of the DC written region 30 is allowed to be formed with departing upwardly from that of the servo band SB by up to X. In this case, the upper side of the DC written region 30 is formed with departing upwardly from that of the servo band SB by Y.

Figure 3B:
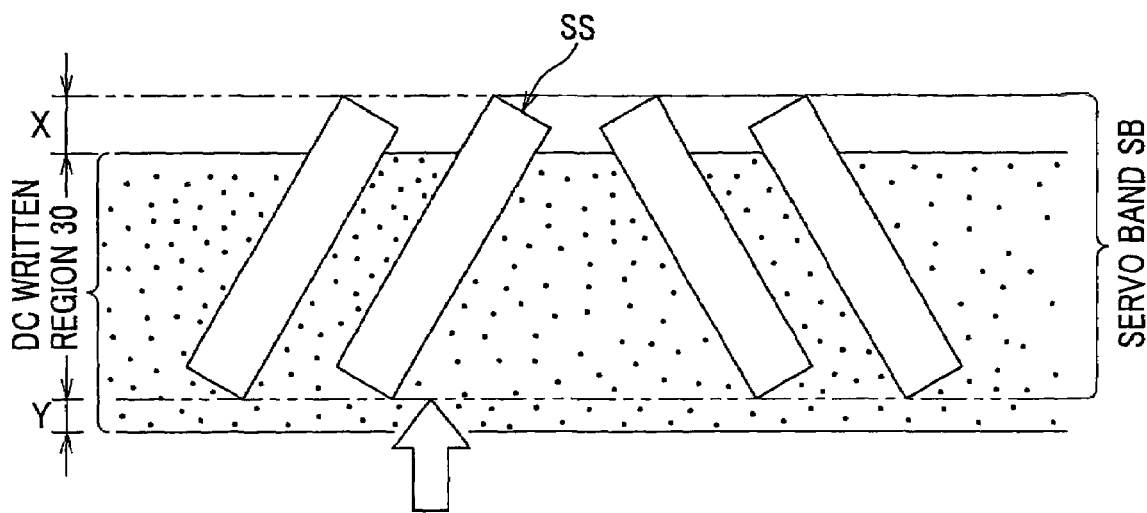
FIG. 3B is an enlarged view depicting a state where the servo signal is shifted upwardly relative to the DC written region.

As shown in FIG. 3B, conversely, when the magnetic tape MT' is shifted toward the other side in the wide thereof (hereinafter, refer to as "upper side") after the DC magnetization, the lower portion of the DC written region 30 is allowed to be formed with departing downwardly from that of the servo band SB by up to Y. In this case, the upper side of the DC written region 30 is formed with departing upwardly from that of the servo band SB by X.

In this embodiment, the position Fd satisfies the equation (1), but the present invention is not limited to this, and for example, the position Fd may satisfy any of following equations (2) to (4).

$$-1.5 \times Tw \leq Fd \leq 1.5 \times Tw \quad (2)$$

$$-Tw \leq Fd \leq Tw \quad (3)$$

$$-(Ps-Sw/2) < Fd < Pd-Tw/2 \quad (4)$$

The magnetic tape MT' which has the above-described arrangement can be effective, especially when being applied to a magnetic tape with a thin magnetic layer or when being used by a magnetic tape drive which has the narrow servo signal read devices SH for reading servo signals SS. Conventionally, in order to prevent saturation of MR elements, it has been avoided that the DC-magnetized portions of the magnetic tape MT' are magnetized in the reverse direction whereby servo signals SS are written onto the magnetic tape MT'. Therefore, a disadvantage which is caused by the presence of the DC written region needs not to be considered. However, the above disadvantage cannot be ignored in a magnetic tape with a thin magnetic layer and narrow data tracks DT for the purpose of an expanded storage capacity per squire. In such case, appropriately provided is, the arrangement of the present invention which enables the servo signals SS to be surly written onto the magnetic tape MT' while the servo signals SS are not largely shifted toward the data band DB of the magnetic tape MT'. Here, the shifted amount of the servo signal SS is defined by a distance between the ends of the DC written region 30 and of the servo band SB.

Such magnetic tape is provided with a magnetic layer 4 having Mrt (a product of a residual magnetization value Mr and a thickness t of the magnetic layer) of preferably $5.0 \times 10^{-10}$ T·m ($4.0 \times 10^{-2}$ memu/cm$^2$) to $7.5 \times 10^{-8}$ T·m ($6.0 \times 10^{-2}$ memu/cm$^2$), more preferably $5.0 \times 10^{-10}$ T·m ($4.0 \times 10^{-2}$ memu/cm$^2$) to $5.0 \times 10^{-8}$ T·m ($4.0 \times 10^{-2}$ memu/cm$^2$), and most preferably $5.0 \times 10^{-10}$ T·m ($4.0 \times 10^{-2}$ memu/cm$^2$) to $2.5 \times 10^{-8}$ T·m ($2.0 \times 10^{-2}$ memu/cm$^2$). Moreover, the thickness t of the magnetic layer is preferably 10 to 300 nm, more preferably 10 to 200 nm, and most preferably 10 to 100 nm.

Figure 4:
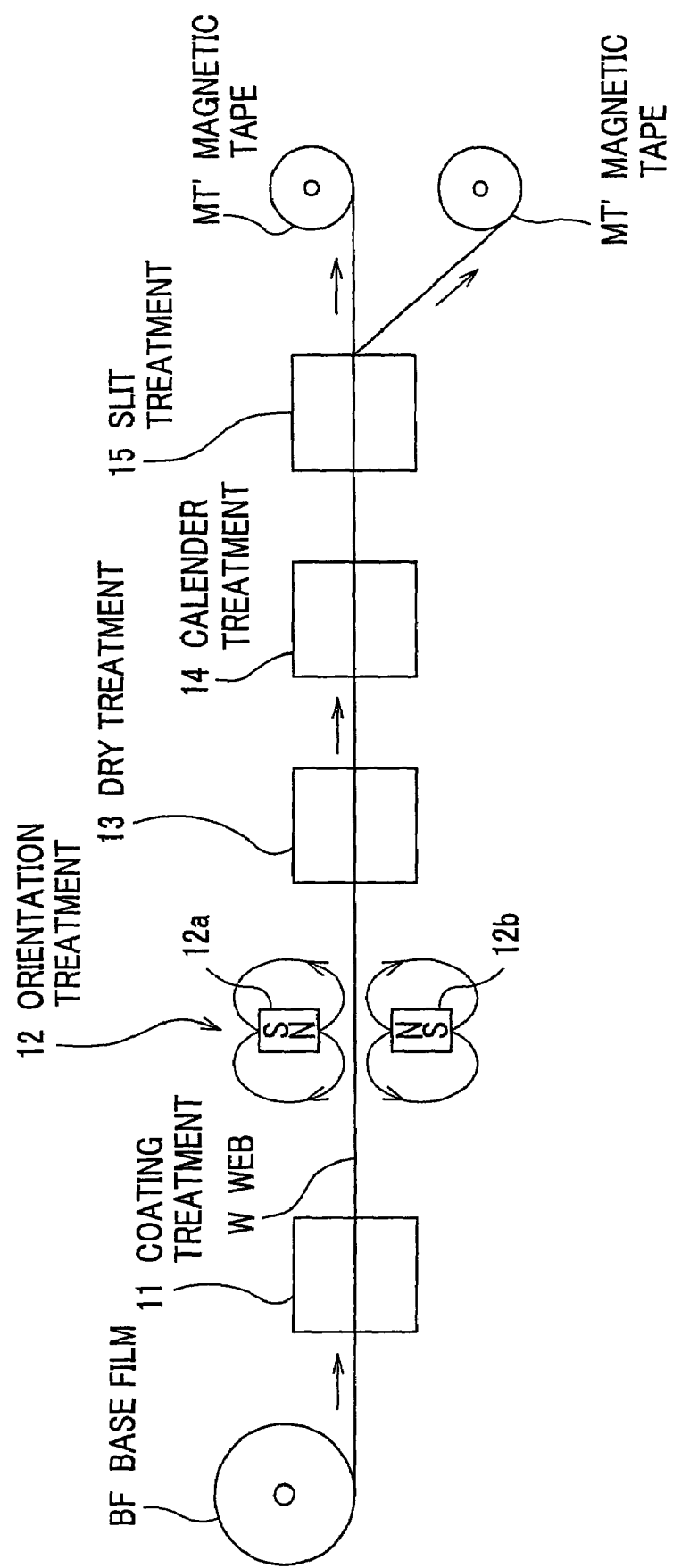
FIG. 4 is a view depicting part of a fabricating step of the magnetic tape.

Next, a fabricating method for the magnetic tape MT' according to the embodiment of the present invention will be described. FIG. 4 shows part of the fabricating treatments.

As shown in FIG. 4, the magnetic tape MT' is fabricated by flowing a base film BF through a coating treatment 11, an orientation treatment 12, a dry treatment 13, calender treatment 14 and slit treatment 15. Note that the magnetic tape MT' which had been subjected to up to the slit treatment 15 does not have any servo signals recorded therein.

The base film BF is a wide film formed of polyethylene terephthalate (PET), etc. In the coating treatment 11, a magnetic coating material in which magnetic powder is dispersed in a solvent medium is coated on one of the surfaces of the base film BF. In some case, the backcoat layer (the other surface) is also coated.

In the orientation treatment 12, the magnetic orientation of the magnetic coating material which has been coated in the coating treatment 11 is aligned, before the material is completely dried. A web W on which the magnetic coating material had been coated is passed through a space having the both sides on which two magnets 12a, 12b are arranged in such a manner that the poles of the same type (North pole in this figure) face toward each other. In this way, the web W is passed between the same poles of the magnets, so that the magnet field lines can be formed in parallel to the surfaces of the web W along the tape length. As a result, the orientation of the magnetic powder in the wet magnetic coating material is aligned with that of the magnet field lines. Note that the magnets may be permanent magnets or electromagnets.

In the dry treatment 13, the magnetic coating material is dried with infrared radiation, hot air or the like.

In the calender treatment 14, the web W is rolled while being pressed by a pair of rollers formed of metal or the like, whereby the evenness of the magnetic layer is enhanced.

In the slit treatment 15, the wide web W is cut into narrow tape shapes to form individual magnetic tapes MT', and the magnetic tapes MT' are separately taken up.

Figure 5:
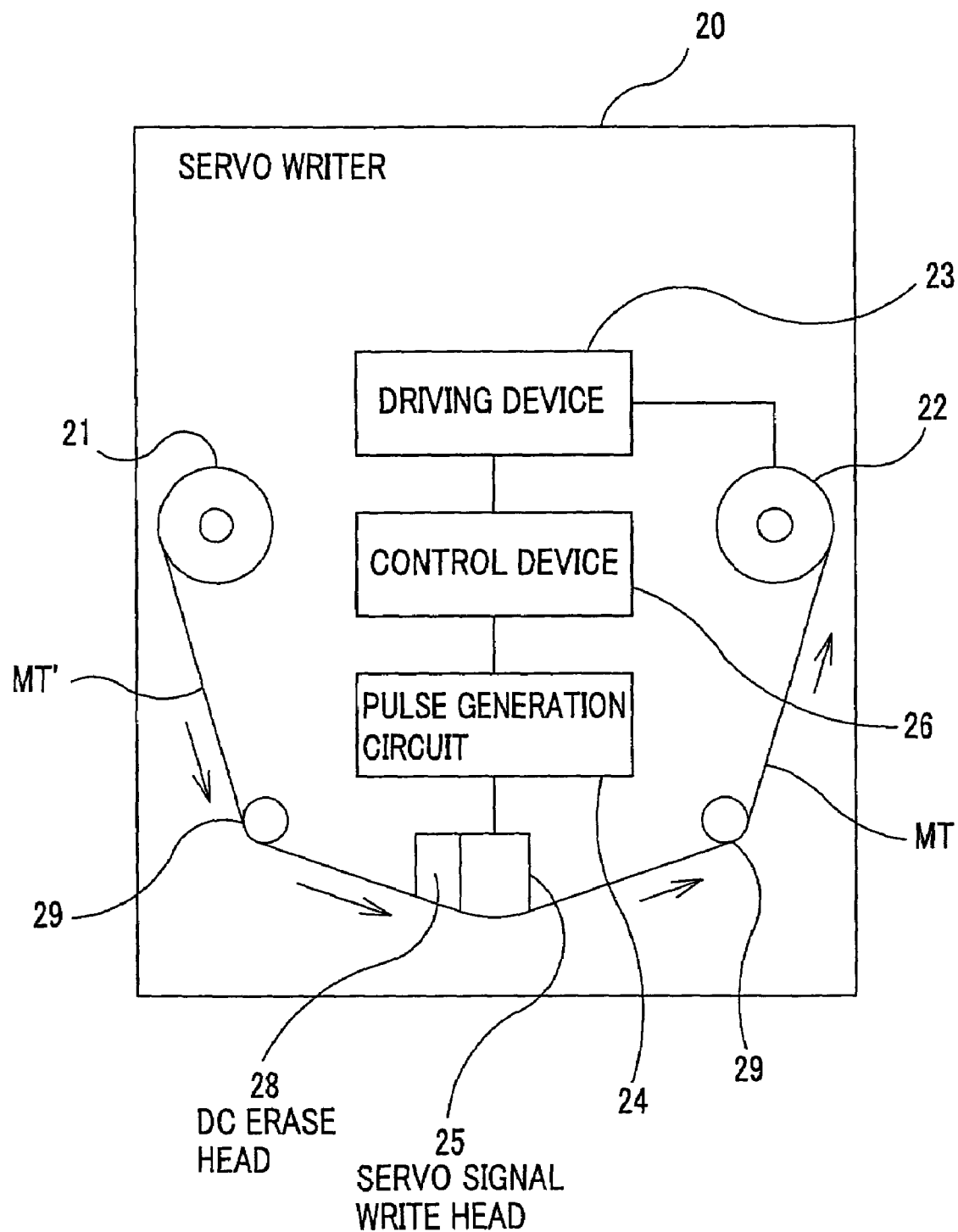
FIG. 5 is a structural view depicting a servo writer according to the embodiment, which is used when a servo signal is written onto a magnetic tape.
Figure 7A:
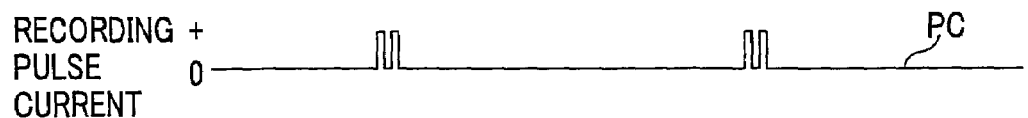
FIG. 7A is a view depicting a recording current when a conventional servo signal is written onto a magnetic tape.
Figure 7B:
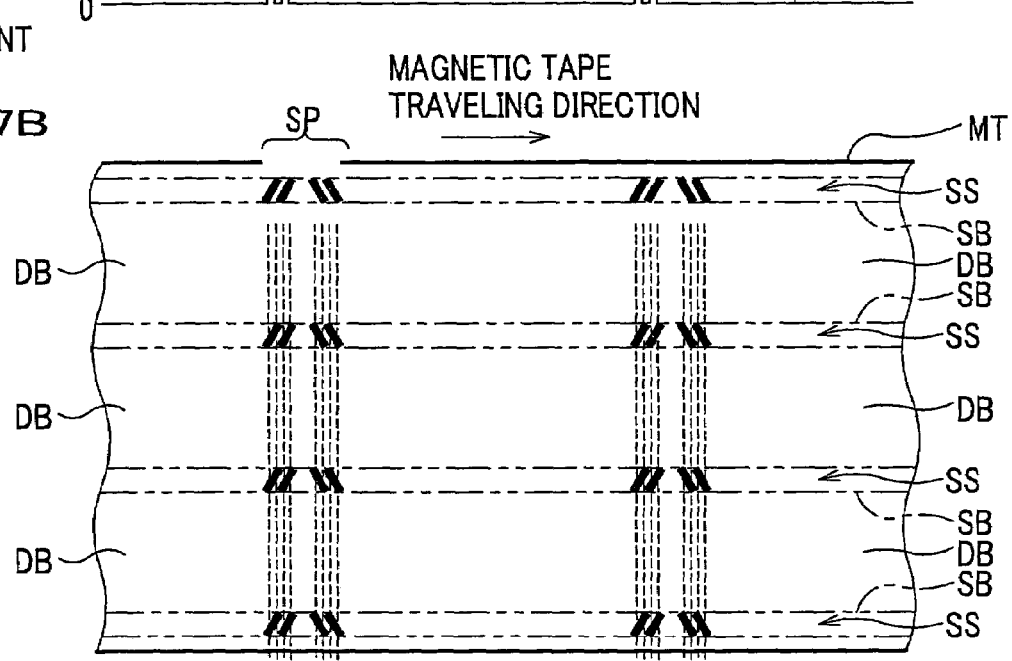
FIG. 7B is a plane view depicting the magnetic tape.
Figure 7C:
FIG. 7C is a view depicting an output read from the servo signal by a wide read device.
Figure 7D:
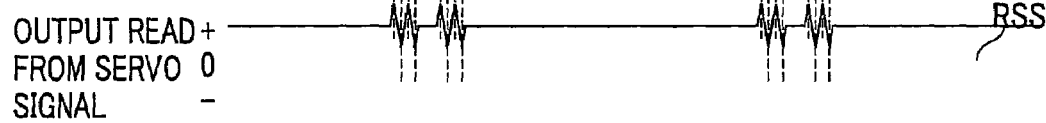
FIG. 7D is a view depicting an output read from the servo signal in a thin magnetic tape.

FIG. 5 is a configuration view of a servo writer used in a treatment by which servo signals are written onto the magnetic tape. FIG. 6 is a plane view of the DC erase head and the servo signal write head.

A servo writer 20 includes, as main components, a supply reel 21, a take-up reel 22, a driving device 23, a pulse generation circuit 24, a servo signal write head 25, a DC erase head 28 and a control device 26. Moreover, the servo writer 20 may also include a power source device, a cleaning device for cleaning the magnetic tape MT', a verifying device for testing the written servo signals SS and the like, which all are not shown in the figure.

The magnetic tape MT' which had been formed by cutting an original web into a product-width and onto which servo signals SS are not written yet is set by a large-diameter reel at the supply reel 21. The supply reel 21 feeds the magnetic tape MT' upon writing of the servo signals SS thereonto. Note that the magnetic tape MT' which is set at the supply reel 21 has been subjected to AC magnetization in an AC magnetizing treatment (not shown).

The magnetic tape MT' fed from the supply reel 21 is guided by a guide 29, etc, and is then transported to the DC erase head 28 and the servo signal write head 25. Further, the servo bands SB of the magnetic tape MT' are subjected to the DC magnetization by the DC erase head 28, and the servo signals SS are then written thereonto by the serve signal write head 25. Subsequently, the magnetic tape MT' is guided by a guide 29, etc and is then transported to the take-up reel 22. The take-up reel 22 is rotatably driven by the driving device 23 and, thus takes up the magnetic tape MT' onto which the servo signals SS has been written.

The driving device 23, which rotatably drives the take-up reel 22, includes a motor, a motor driving circuit for supplying a current to the motor, a gear for coupling the shaft of the motor with the take-up reel 22, and the like, which all are not in the figure. The driving device 23 generates a motor current in the motor driving circuit, based on a motor current signal from the control device 26, supplies the motor current to the motor, then transfers rotatably driving power of the motor to the take-up reel 22 through the gear, and as a result, the take-up reel 22 is rotatably driven.

The pulse generation circuit 24, which supplies a recording pulse current to the servo signal write head 25, includes various electronic components. The pulse generation circuit 24 repeats such a pattern that a positive-polarity plus pulse current, zero current, plus pulse current and zero current are continuously generated in this order and, subsequently no current is generated during a predetermined period (zero current), based on the pulse control signal from the control device 26 (refer to FIG. 2C). This is how the recording pulse current is generated. Furthermore, the pulse generation circuit 24 supplies this recording pulse current to a coil (not shown) of the servo signal write head 25. The pulse current is large enough to magnetize the magnetic layer of the magnetic tape MT' by means of leakage flux from the head gaps 25a shown in FIG. 6, and this current amount is set based on the property of coil of the servo signal write head 25 and the like. Also, the pulse width (duration) of the plus pulse current can define the predetermined width of the servo pattern SP along the length of the magnetic tape MT', and this pulse width is set based on the traveling speed of the magnetic tape MT', the shape of head gaps 25a of the servo signal write head 25, and the like. Further, the predetermined period of the zero current can define the predetermined interval constituting the servo patterns SP, and is set based on the traveling speed of the magnetic tape MT' and the like. Furthermore, the above pulse generation circuit 24 also continuously applies a degaussing signal to the DC erase head 28 prior to writing of the servo signals SS.

The servo signal write head 25, which writes the servo signals SS, includes a coil for generating magnetic flux (not shown in the figure) and the head gaps 25a formed therein (refer to FIG. 6). In the servo signal write head 25, four head gaps 25a, 25a, 25a and 25a are arranged in a line while corresponding to those of four servo bands SB1, SB1, SB1 and SB1 of the magnetic tape MT' along the width thereof. Each head gap 25a is formed by means of a lithography technique to which a semiconductor technique is applied, and has a trapezoid shape of which sides each form a predetermined angle with respect to the length of the magnetic tape MT'.

The erase head 28 has the head gaps 28a corresponding to the head gaps 25a of the servo signal write head 25 in one-to-one relationship. The widths of each head gap 28a and of each head gap 25a (sizes along the width of the tape MT') are formed such that the positions Fd of end of the DC written region 30 satisfy the equation (1), that is, such that the width of each head gap 28a is narrower than that of each head gap 25a in this embodiment. Specifically, each head gap 28a is formed to have a wide obtained by subtracting the sum of the widths of X and Y from the width of each head gap 25a (the width of servo band SB) (refer to FIG. 3). The head gaps 28a, 25a are formed in this way, so that the DC written region 30 and the servo band SB are formed to satisfy the above condition. In this embodiment, the head gap 28a is formed to be narrower than the head gap 25a. For example, however, when the servo signal SS is written onto the DC written region 30, if the servo signal SS (servo band SB) is largely shifted therefrom (i.e., if the Fd does not satisfy the equation (1)), it is preferable that the width of the head gap 28a is enlarged and the shifted part of the servo signal SS from the DC written region 30 is shrank, so that the distance between the ends of the DC written region 30 and the servo signal SS falls within an allowable range. Alternatively, if the servo signal SS remains within the DC written region 30, but the position Fd does not satisfy the equation (1), it is preferable that the width of the head gap 28a is reduced such that the distance between the ends of the DC written region 30 and of the servo signal SS fall within an allowable range.

The control device 26, which controls the operation of each section in the servo writer 20, includes a central processing unit (CPU), various memories and the like, as shown in FIG. 5. The control device 26 generates a motor current signal for controlling the motor current of the driving device 23, and transmits the signal to the driving device 23, in order to maintain the magnetic tape MT' at a constant traveling speed upon writing of the servo signals SS. The control device 26 generates a pulse control signal for controlling the current value, the pulse width and the generating timing of the plus pulse current of the recording pulse current, and transmits the signal to the pulse generation circuit 24, in order to set the servo signal SS which defines the width of the servo pattern SP along the length of the magnetic tape MT' and a predetermined interval between the servo patterns SP. Specifically, the control device 26 generates the above pattern constituted of the plus pulse current, the zero current, the plus pulse current and the zero current.

A step will be described of subjecting the servo bands SB of the magnetic tape MT' to the DC magnetization by use of the above-described servo writer, and of writing the servo signals SS thereonto.

First, as shown in FIG. 5, a reel of the magnetic tape MT' which has been slit is set at the supply reel 21 of the servo writer 20, and one end of the magnetic tape MT' is then coupled to the core of the take-up reel 22. Here, the magnetic tape MT' is run while being guided by the guide 29, etc and being taken up by the take-up reel 22 being driven by the driving device 23. In addition, the DC written regions 30 are formed by the DC erase head 28 which is in contact with the running magnetic tape MT', and the servo signals SS are then written onto the corresponding DC written regions 30 by the servo signal write head 25, as shown in FIG. 6.

Should the magnetic tape MT' be moved along the width thereof upon writing of the servo signal SS, the servo signals SS which are written onto the magnetic tapes MT' by the servo signal write head 25 are shifted from the corresponding DC written regions 30. However, this shifted amount (the distance between the ends of the servo signal SS and the DC written region 30) falls within an allowable range, thanks to the above structure. This enables the servo signals SS to be written onto the DC written regions 30 without largely deviating from the DC written regions 30, respectively.

The magnetic tape MT' onto which the servo signals SS have been written in such a manner is taken up by the take-up reel 22 shown in FIG. 5. Subsequently, the magnetic tape MT' is cut to a predetermined length in accordance to specifications of products, and is accommodated in a cartridge case or the like (not shown).

With the above-described magnetic tape and servo writer of the present invention, it is possible to produce a following effect.

The end of each DC written region 30 is located within a predetermined range relative to the end of each servo band SB. In other words, the shifted amount of the servo signal SS relative to the DC written region 30 is minimized. This makes it possible to accept the movement of the magnetic tape MT' along the width thereof after the DC magnetization, as well as the offset caused due to the dimensional accuracy of the head gaps 28*a*, 25*a* and the attaching accuracy of the heads 28, 25. Further, with the magnetic tape MT' in which the DC written regions 30 and the servo signals SS are formed in such a manner, it is possible to securely prevent, from being deteriorated, the S/N ratio of the outputs read from the servo signals SS, because the servo signals SS are written onto the corresponding DC written regions 30 without being largely shifted therefrom.

Moreover, an amount by which the end of the DC written region 30 protrudes from that of the servo band SB to the data track DT has a predetermined value of less than the width Tw of the data track DT. Therefore, the DC written region 30 is excessively not entered into the data band DT, thereby allowing the high density recording design to be improved.

The present invention is not limited to the above-described embodiment, but may be implemented in various forms.

In the embodiment of the present invention, the DC written regions 30 are formed by the DC erase head 28 having head gaps 28*a* of predetermined dimensions. However, the present invention is not limited to this, but the DC written regions 30 of predetermined dimensions may be formed, for example, by subjecting only the data band DB to the AC magnetization by use of the AC erase head, after subjecting the whole surface of the magnetic tape MT' to the DC magnetization by use of the DC erase head, during the orientation treatment 12 (refer to FIG. 4).

Although the preferred embodiment of the present invention has been described in detail, it should be understood that various changes, substitutions and alterations can be made therein without departing from spirit and scope of inventions as defined by the appended claims.

What is claimed is:

1. A magnetic tape comprising,
   a DC-magnetized DC written region;
   a servo signal being written onto the DC written region;
   a data track; and
   the DC written region and the servo signal being formed to satisfy a relationship:

$-1.5 \times Tw \leq Fd \leq 1.5 \times Tw$ wherein Fd denotes a position of an end of the DC written region with respect to an end of the servo signal, and Tw denotes a width of the data track.

2. A magnetic tape according to claim 1,
   wherein the DC written region and the servo signal are formed to satisfy a relationship:

$-Tw \leq Fd \leq Tw.$

3. A magnetic tape according to claim 1,
   wherein the DC written region and the servo signal are formed to satisfy a relationship:

$-(Ps-Sw/2) < Fd < Pd-Tw/2$ wherein Ps denotes a distance from the end of the servo signal to a nearest point on a middle of the servo track, Sw denotes a width of a servo signal read device for tracing the servo track, and Pd denotes a distance from the end of the servo signal to a nearest point on the middle of the data track.

4. A magnetic tape according to claim 1,
   wherein the DC written region and the servo signal are formed to satisfy a relationship:

$-(Ps-Sw/2-(Tw-Rw)/2) < Fd < Pd-Tw/2-(Tw-Rw)/4$ wherein Ps denotes a distance from the end of the servo signal to a nearest point on a middle of the servo track, Sw denotes a width of the servo signal read device for tracing the servo track, Rw denotes a width of the data read device for tracing the data track, and Pd denotes a distance from the end of the servo signal to a nearest point on a middle of the data track.

5. A magnetic tape according to claim 1, further comprising a magnetic layer having Mrt ranging from $5.0 \times 10^{-10}$ T·m to $7.5 \times 10^8$ T·m, Mrt indicating a product of a residual magnetization value and a thickness of the magnetic layer.

6. A magnetic tape according to claim 2, further comprising a magnetic layer having Mrt ranging from $5.0 \times 10^{-10}$ T·m to $7.5 \times 10^{-8}$ T·m, Mrt indicating a product of a residual magnetization value and a thickness of the magnetic layer.

7. A magnetic tape according to claim 3, further comprising a magnetic layer having Mrt ranging from $5.0 \times 10^{-10}$ T·m to $7.5 \times 10^{-8}$ T·m, Mrt indicating a product of a residual magnetization value and a thickness of the magnetic layer.

8. A magnetic tape according to claim 4, further comprising a magnetic layer having Mrt ranging from $5.0 \times 10^{-10}$ T·m to $7.5 \times 10^{-8}$ T·m, Mrt indicating a product of a residual magnetization value and a thickness of the magnetic layer.

9. A magnetic tape according to claim 1, further comprising a magnetic layer having a thickness ranging from 10 to 300 nm.

10. A magnetic tape according to claim 2, further comprising a magnetic layer having a thickness ranging from 10 to 300 nm.

11. A magnetic tape according to claim 3, further comprising a magnetic layer having a thickness ranging from 10 to 300 nm.

12. A magnetic tape according to claim 4, further comprising a magnetic layer having a thickness ranging from 10 to 300 nm.

13. A magnetic tape according to claim 5, further comprising a magnetic layer having a thickness ranging from 10 to 300 nm.

14. A magnetic tape according to claim 6, further comprising a magnetic layer having a thickness ranging from 10 to 300 nm.

15. A magnetic tape according to claim 7, further comprising a magnetic layer having a thickness ranging from 10 to 300 nm.

16. A magnetic tape according to claim 8, further comprising a agnetic layer having a thickness ranging from 10 to 300 nm.

17. A servo writer for writing a servo signal onto a DC-magnetized DC written region of a magnetic tape, the servo writer comprising:
a magnetic tape running system including a supply reel and a take-up reel, the magnetic tape running system for traveling a magnetic tape by taking up, by use of the take-up reel, the magnetic tape fed from the supply reel;
a DC erase head for subjecting a part of the magnetic tape to DC magnetization in one direction along length of the magnetic tape while being in contact with the running magnetic tape to thereby form a DC written region, the DC erase head being provided with a head gap;
a servo signal write head for writing the servo signal onto the DC written region by magnetizing the DC written region in a direction opposite to the one direction while being in contact with the running magnetic tape, the servo signal write head being provided with a head gap, the servo signal write head being provided downstream of the DC erase head in a traveling direction of the magnetic tape; and the head gaps of the DC erase head and of the servo signal write head having respective dimensions capable of producing a magnetic tape satisfying a relationship:

$$-1.5 \times Tw \leq Fd \leq 1.5 \times Tw$$

wherein Fd denotes a position of an end of the DC written region with respect to an end of the servo signal, and Tw denotes a width of a data track.

18. A servo writer according to claim 17,
wherein the head gaps of the DC erase head and of the servo signal write head having respective dimensions capable of producing a magnetic tape satisfying a relationship:

$$-Tw \leq Fd \leq Tw.$$

19. A servo writer according to claim 17,
wherein the head gaps of the DC erase head and of the servo signal write head having respective dimensions capable of producing a magnetic tape satisfying a relationship:

$$-(Ps-Sw/2) < Fd < Pd-Tw/2$$

wherein Ps denotes a distance from the end of the servo signal to a nearest point on a middle of the servo track, Sw denotes a width of a servo signal read device for tracing the servo track, and Pd denotes a distance from the end of the servo signal to a nearest point on the middle of the data track.

20. A servo writer according to claim 17,
wherein the head gaps of the DC erase head and of the servo signal write head having respective dimensions capable of producing a magnetic tape satisfying a relationship:

$$-(Ps-Sw/2-(Tw-Rw)/2) < Fd < Pd-Tw/2-(Tw-Rw)/4$$

wherein Ps denotes a distance from the end of the servo signal to a nearest point on a middle of the servo track, Sw denotes a width of the servo signal read device for tracing the servo track, Rw denotes a width of the data read device for tracing the data track, and Pd denotes a distance from the end of the servo signal to a nearest point on a middle of the data track.

* * * * *